Aug. 22, 1967  H. W. HEYMAN ET AL  3,337,786
ADJUSTABLE SPEED MOTOR CONTROL SYSTEM
Filed July 15, 1964
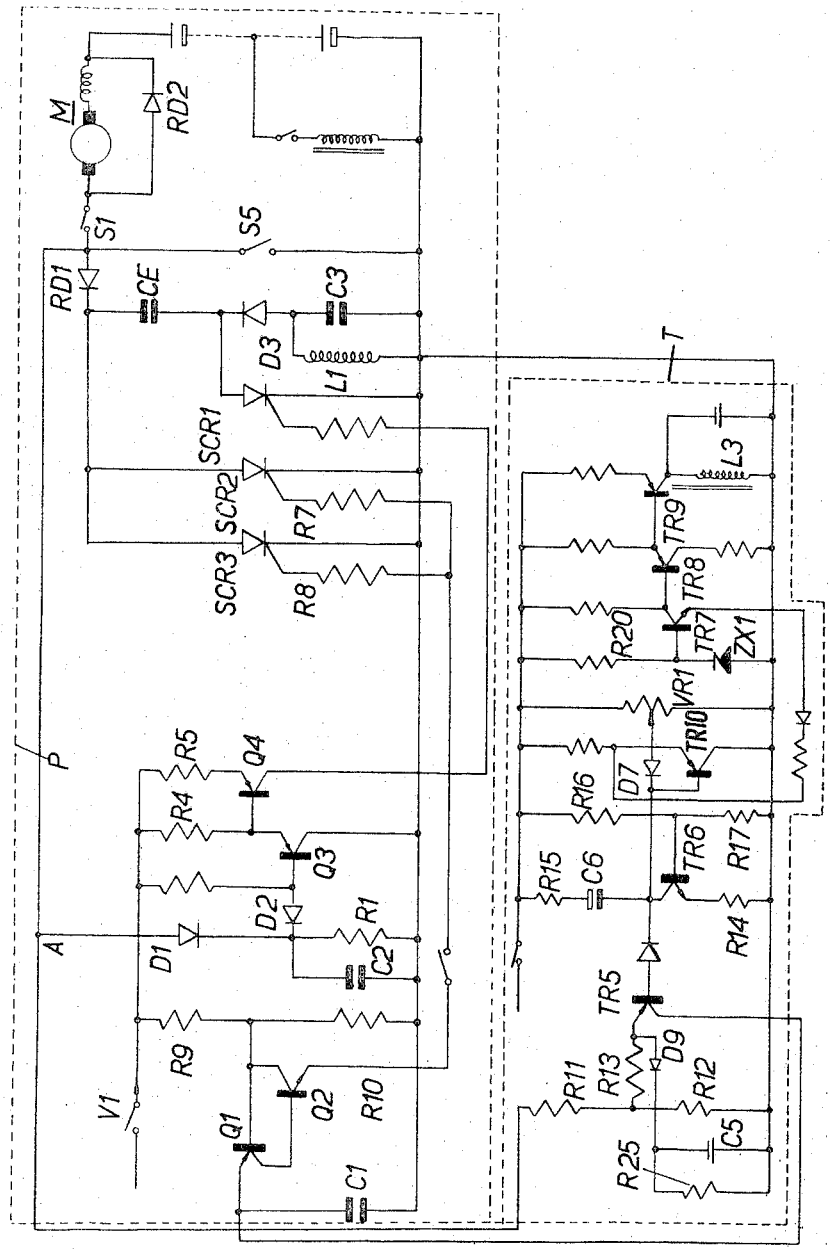
INVENTORS
HORACE W. HEYMAN
JAMES HAMBLETON
DAVID GURWICZ
BY JOHNSON & KLINE 3,337,786
ADJUSTABLE SPEED MOTOR CONTROL SYSTEM
Horace W. Heyman, Appletree House, Fellside, Whickham, Newcastle-upon-Tyne, England; James Hambleton, 16 Bracken Drive, Whickham Hill Estate, Dunston-on-Tyne, Gateshead 11, England; and David Gurwicz, 140 Whitehall Road, Gateshead 8, England
Filed July 15, 1964, Ser. No. 382,804
1 Claim. (Cl. 318—308)

This invention is for improvements in or relating to speed control means for electric motors.

The invention is particularly, although not exclusively concerned with speed control means for traction motors for electrically propelled vehicles.

Rapid or violent operation of the foot pedal or equivalent speed control member of an electrically propelled vehicle can result in damage to the mechanical transmission and possible burn-out of the motor due, to the extremely high torque output that can be obtained under "stall" conditions from a D.C. series motor such as is used for traction purposes. This is particularly the case with some control systems of the character described and claimed in our British patent specification No. 950,734.

For some purposes it is convenient in a system as claimed and described in our British patent specification No. 950,734 to provide an arrangement which is adapted to cut out the pulse frequency control system at an appropriate time (e.g. when the motor has been brought up to a predetermined speed) and connect the motor to the supply directly or through a conventional (e.g. resistance) control arrangement. The risk of the aforementioned damage to the motor and power transmission means may, in certain circumstances, be even greater with an arrangement as just described because, if, for instance, a contactor, which at full speed cuts out the pulse generating circuits, is closed mechanically by the foot operated speed-control of the vehicle reaching the limit of its travel, which is a convenient arrangement to adopt, then a driver slamming' his foot down on the control pedal could close this contactor and apply full battery voltage across the motor with the vehicle at a standstill.

Having regard to what is stated above it will be appreciated that there is a requirement for a delay circuit or system in control apparatus of the nature concerned which will prevent the possibility of the aforementioned damage to the mechanical transmission and burn-out of the motor or motors.

An object of the present invention is to meet this requirement.

According to the present invention there is provided a speed control system for an electric motor comprising a pulse generator circuit adapted to be inserted between the supply and the motor to be controlled, means for adjusting the pulses and thereby the mean power applied to the motor and the speed thereof, a contactor or other device adapted to cut out said pulse speed-control-means for operation of the motor independently thereof, and an electric time delay circuit or system including an electronic device having a control electrode the potential of which changes with adjustment of said pulse speed-control-means and which at a predetermined potential causes operation of said contactor or other device to cut out the pulse speed-control-means. Conveniently the electronic device is a transistor.

According to a further feature of the present invention there is provided a speed control system for an electric motor comprising a pulse generator circuit adapted to be inserted between the supply and the motor to be controlled, means for adjusting the pulse frequency and thereby the mean power applied to the motor and the speed thereof, a contactor or other device adapted to cut out the pulse frequency control system and connect the motor to the supply directly, and a time delay system for the energising circuit of said contactor or other device which time delay circuit or system includes an electronic device sensitive to the adjustment of the pulse frequency adjusting means, the arrangement being such that after a predetermined increase in the pulse rate there is a change in the potential of an electrode of said electronic device which brings about operation of the contactor or other device to cut out the pulse frequency control system. In this arrangement also the electronic device is conveniently a transistor.

One particular embodiment of the invention will now be described by way of example as applied more particularly to a control system as described in our aforementioned British patent specification. In the following description reference is made to the accompanying diagrammatic drawing.

The pulse control circuitry, which is indicated generally by the rectangle in dotted lines designated P, comprises a capacitor C1, electrolytic capacitor CE, silicon controlled rectifiers SCR1, SCR2 and SCR3, semi-conductor diodes D1, D2 and D3, transistors Q1, Q2, Q3 and Q4, semi-conductor power diodes RD1 and RD2 and inductor L1 and a contactor switch S1. TR5 is a charging transistor.

Ignoring components RD1 and C2 and considering the battery voltage V to be a constant, voltage V1 is some voltage smaller than V and obtained, for simplicity from a tapping point on the battery this voltage is applied before the closure of S1. With S1 open, the potential at the emitter of Q1 is zero, i.e. there is no charge on C1 and the relaxation oscillator, made up of components TR5, C1, Q1, Q2, R9, R10, R7, R8 and the gate-cathode impedances of SCR3 and SCR2 is quiescent. SCR3 and SCR2 are therefore non-conducting.

The potential at the base of Q3, neglecting any forward voltage drop across D2 is given approximately by $$\frac{V1R1}{b3\ R4+R1}$$

where $b3$ is the gain of Q3 in the common emitter mode. The potential difference across R5 is also approximately this value and therefore a current $$\frac{V1R1}{(b3\ R4+R9)R5}$$

flows into the gate of SCR1, this is sufficient to make SCR1 fully conducting.

The closure of S1, produces the following effects:

(1) Current flows from the battery via the motor M and SCR1 to charge the reversible electrolytic capacitor CE to battery potential V.

(2) During the charging of CE the potential of point A rises from zero to V, cutting off transistors Q3 and Q4, SCR1 however, remains conducting until the charging current through CE drops to below the holding value for this SCR.

(3) Capacitor C1, commences to charge on a time constant given by the impedance of transistor TR5 multiplied by C1, the impedance of TR5 being initially large. When C1 has charged to a voltage given by $$\frac{V1R10}{R2+R10}$$

it is rapidly discharged by Q1 and Q2 into gates of SCR3 and SCR2, turning them on. R7 and R8 are gate impedance matching resistances. The conduction of SCR2 and SCR3 has the following effects:

(1) The battery voltage V is applied across the motor circuit and current builds up in the motor with a time constant $L/R$, where L is the motor inductance and R any resistance in the circuit.

(2) Capacitor CE discharges inductively via SCR2, SCR3, L1, and D3. This results in the reversal of charge across CE. This reverse charge is held by D3.

(3) Since point A is effectively at zero potential, C2 discharges with a time constant C2, R1.

(4) C1 cannot recharge.

When the potential across C2 has fallen sufficiently to turn on Q4, SCR1 is consequently turned on and the reverse potential held by CE is applied across SCR2 and SCR3, turning them off. CE then recharges in the original direction, during which, point A rises from zero to V. The above process is then repeated. Due to the inductive nature of the motor and the low forward impedance of RD2, current will continue to flow within the motor and via RD2, during the interpulse period.

It will be appreciated that the duration of an "on" pulse is given by the time constant C2, R1, and the duration of the interpulse period is given by the time constant C1, multiplied by the impedance of TR5. Since the impedance of TR5 is variable, the operator is able to vary the pulse repetition rate and thus the mean power in the motor, keeping the pulse width constant.

It has been assumed in the previous description, that the battery voltage V is a constant. The battery voltage, however, exhibits the following characteristics under short sharp high current pulses. At the initiation of a pulse, the battery E.M.F. drops to zero or nearly so for 1 or 2 microsecs., its terminal E.M.F. then rises to its nominal value V minus the normal drop due to the passage of load current. At the termination of a pulse, however, the battery E.M.F. overshoots its nominal value V by an amount $v$ say. The value of $v$ is proportional to the load current flowing just previous to switch off, i.e. the battery exhibits an inductive effect. In other words the battery behaves as if it has an inductor connected in series with it.

Consider now that SCR2 and SCR3 have just been switched off and the battery voltage has overshot to $V+v$. CE will then charge up rapidly to $V+v$, and SCR1 will switch off. The battery voltage then drops back to V and CE discharges inductively in the absence of RD1, via RD2, the battery L1 and D3 to a potential $V-v$. On the refiring of SCR2 and SCR3 this potential will be reversed as explained previously.

Since, on a lead acid battery, $v$ can tend to V, the result is that the stored charge on CE is reduced as the mean current taken from the battery increases. This is extremely detrimental to the operation of the circuit and in practice means that SCR2 and SCR3 will not be switched off at high current values. The inclusion of RD1 ensures that not only is the stored charge on CE not reduced by the battery transients, but in fact the stored charge is increased as the mean current taken from the battery is increased.

Due to the effect of "hole storage" in RD1 high voltage transients are possible in L1 and capacitor C3 is placed across it.

For the purpose of the present invention the system includes a contactor S5 having a closing coil L3, said contactor being adapted to close, as hereinafter described, at a predetermined pulse frequency (i.e. when the pulse rate is at a maximum) so as to connect the motor M directly to the supply which in this case is a storage battery.

Also included in the system, for the reason previously referred to, is a time delay circuit indicated generally by the dotted rectangle designated T.

Referring to the time delay circuit, the resistors R16 and R17 are connected as a potential divider across the supply which, by way of example, may be assumed to be a 30 volt supply the arrangement being such as to give a potential of approximately 5 volts at the junction between the resistors R16 and R17. This junction is connected to the base of a n.p.n. transistor TR6. R14 is the emitter resistor of transistor TR6. Thus, the current flowing in the collector of transistor TR6 will be approximately $5/R14$ amps.

The current flowing in the collector of the transistor TR6 charges a capacitor C6 linearly, via a resistor R15, the arrangement being such that the collector potential of transistor TR6 falls from 30 volts to, say, 9 volts in, say, four seconds. This fall in potential is halted at the potential of the slider of the potentiometer VR1. The slider of this potentiometer is coupled to the accelerator pedal or equivalent of the vehicle on which the system is installed and it is by adjustment of this slider that the driver of the vehicle controls the pulse frequency and thereby the speed of the vehicle motor. If, for example, the operator sets the slider of the potentiometer VR1 to 15 volts the collector of the transistor TR6 will fall linearly from 30 volts to 15 volts and no further.

To obtain an "ON" signal to the silicon control rectifiers SCR2 and SCR3 the capacitor C1 must charge to a potential determined by resistors R9 and R10. The time taken for capacitor C1 to charge determines the pulse rate of the system. Capacitor C1 is charged via the transistor TR5, the charging current available being determined by the potential difference between the base potential of the transistor TR5 and that developed at the junction of resistors R11 and R12, divided by the resistance of resistor R13. Assuming that the potential at the junction of resistors R11 and R12 is 30 volts then initially when the collector of the transistor TR6 is at 30 volts no current flows through the transistor TR5 and there is no pulse generation.

As the potential of the collector of the transistor TR6 falls the current flow down the transistor TR5 increases and hence the rate of pulse generation and motor speed also increase.

The diode D9 and capacitor C5 and resistance R25 are included in the circuit to prevent the possibility of transients from the battery supply being fed into the oscillator circuit.

The base of the transistor TR7 is held at, for example 9 volts by means of the resistor R20 and the Zener diode ZX1. When the potential of the collector of the transistor TR6 falls to 9 volts, which coincides with a predetermined rate of pulse generation and motor speed, transistor TR7 is turned on, turning on transistor TR8 and hence transistor TR9 and energising the closing coil L3 of the contactor S5 and causing the closing thereof so as to cut out the pulse generation circuit and connect the motor M directly across the supply.

should the driver of the vehicle "slam" his foot down hard on the accelerator pedal the potential of the slider of VR1 would go instantaneously to zero. However, the potential at the collector of transistor TR6 would not follow instantaneously due to the presence of capacitor C6 and diode D7. This potential will fall linearly, the rate depending upon the current flowing in TR6, and this is dependent on the potential at the junction of R16, R17 and the value of R14. The gradual fall in potential would be reflected by a gradual increase in pulse rate experienced by the motor. When this potential has fallen to below 9 volts the shorting contactor is automatically brought in. It will be appreciated, therefore, that however fast the driver operates the accelerator pedal the vehicle cannot accelerate in a shorter time than that set by the time delay.

The transistor TR10 is simply an impedance matching stage, the emitter of this transistor following its base which is at the collector potential of transistor TR6.

We claim:

A speed control system for an electric motor comprising an electric power supply, a pulse generator circuit adapted to be inserted between the supply and the motor, means for adjusting the pulse frequency and thereby the mean power applied to the motor and the speed thereof, contactor means upon energization being adapted to cut out the pulse generator circuit and connect the motor to the supply through a control means, said contactor means being energized at a predetermined condition of the motor related to its output and a time delay system for delaying the energizing of said contactor means including an electronic device sensitive to the adjustment of the pulse frequency adjusting means, the arrangement being such that after predetermined increase in the pulse rate there is a change in the potential of an electrode of said electronic device which brings about operation of the contactor means for cutting out the pulse generator system.

References Cited

UNITED STATES PATENTS

| | | | |
|---|---|---|---|
| 3,191,113 | 6/1965 | Gargani | 318—341 X |
| 3,214,666 | 10/1965 | Clere | 318—341 X |
| 3,222,582 | 12/1965 | Heyman et al. | 138—139 |
| 3,223,908 | 12/1965 | Hutchinson et al. | 318—139 |
| 3,243,681 | 3/1966 | Dannettell | 318—139 X |

ORIS L. RADER, *Primary Examiner.*

J. C. BERENZWEIG, J. J. BAKER,

*Assistant Examiners.*